United States Patent
Erickson

(10) Patent No.: US 11,229,193 B2
(45) Date of Patent: Jan. 25, 2022

(54) ROTATING SPINNER BLADE ASSEMBLY FOR FISHING LURES

(71) Applicant: Charles Erickson, Coos Bay, OR (US)

(72) Inventor: Charles Erickson, Coos Bay, OR (US)

(73) Assignee: Charles Erickson, Coos Bay, OR (US)

( * ) Notice: Subject to any disclaimer, the term of this patent is extended or adjusted under 35 U.S.C. 154(b) by 399 days.

(21) Appl. No.: 15/046,044

(22) Filed: Feb. 17, 2016

(65) Prior Publication Data

US 2017/0231208 A1    Aug. 17, 2017

Related U.S. Application Data

(60) Provisional application No. 62/134,721, filed on Mar. 18, 2015.

(51) Int. Cl.
*A01K 85/10*     (2006.01)
*A01K 85/12*     (2006.01)

(52) U.S. Cl.
CPC .............. *A01K 85/10* (2013.01); *A01K 85/12* (2013.01)

(58) Field of Classification Search
CPC ......... A01K 85/10; A01K 85/18; A01K 85/12
USPC ............. 43/42.11, 42.12, 42.14, 42.19, 42.2, 43/42.21, 42.13, 42.15, 42.32, 42.33, 43/42.34
See application file for complete search history.

(56) References Cited

U.S. PATENT DOCUMENTS

| | | | | |
|---|---|---|---|---|
| 281,083 | A * | 7/1883 | Kessler | A01K 85/16 43/42.02 |
| 295,350 | A * | 3/1884 | Chapman | A01K 85/12 43/42.2 |
| 323,111 | A * | 7/1885 | Chapman | A01K 85/16 43/42.12 |
| 830,404 | A * | 9/1906 | Barnes | A01K 85/12 43/42.21 |
| 1,002,785 | A * | 9/1911 | Telford | A01K 85/12 416/176 |
| 1,636,904 | A * | 7/1927 | Elwood | A01K 85/10 43/42.33 |
| 1,754,567 | A * | 4/1930 | Newell | A01K 85/10 43/42.17 |
| 1,772,250 | A * | 8/1930 | Hagen | A01K 85/12 43/42.21 |

(Continued)

FOREIGN PATENT DOCUMENTS

CH       256420 A * 8/1948 ............ A01K 85/12
EP       38245 A1 * 10/1981

(Continued)

*Primary Examiner* — Darren W Ark
(74) *Attorney, Agent, or Firm* — Chernoff Vilhauer LLC

(57) ABSTRACT

A concave-type spinner blade and lure body assembly for use with fishing lures that generates mechanical energy to rotate the lure body to attract fish is provided herein. The spinner blade is connected to the lure body by a connector that freely rotates around the lure's spindle. The lure body is suspended from the lure spindle by a plurality of rotational elements that are housed within the lure body. The rotational mechanical energy causes the lure body to rotate thereby producing an effect that attracts fish. The present invention can be used with trolling or casting lures used in bays, rivers, lakes, oceans, and estuaries to catch a wide variety of fresh and saltwater fish.

19 Claims, 16 Drawing Sheets

(56) References Cited

U.S. PATENT DOCUMENTS

| | | | | |
|---|---|---|---|---|
| 1,822,785 | A * | 9/1931 | Petrie | A01K 85/12 43/42.12 |
| 1,874,883 | A * | 8/1932 | Brown | A01K 85/10 43/42.19 |
| 1,897,529 | A * | 2/1933 | Palmer | A01K 85/12 43/42.2 |
| 1,920,676 | A * | 8/1933 | Burckhardt | A01K 85/12 43/42.21 |
| 1,993,868 | A * | 3/1935 | Thornberg | A01K 85/12 43/42.12 |
| 2,066,254 | A * | 12/1936 | Ernest | A01K 85/10 43/42.17 |
| 2,078,816 | A * | 4/1937 | Shenitz | A01K 85/12 244/1 TD |
| 2,192,563 | A * | 3/1940 | Starkey | A01K 85/10 43/42.34 |
| 2,206,274 | A * | 7/1940 | Wiberg | A01K 85/10 43/42.19 |
| 2,306,692 | A * | 12/1942 | Flood | A01K 85/16 43/42.21 |
| 2,481,789 | A * | 9/1949 | Smith | A01K 85/18 43/42.15 |
| 2,554,342 | A * | 5/1951 | O'Callaghan | A01K 85/12 43/42.21 |
| 2,569,057 | A * | 9/1951 | Hinerman | A01K 85/12 43/42.14 |
| 2,592,445 | A * | 4/1952 | McCarthy | A01K 85/12 43/41 |
| 2,621,437 | A * | 12/1952 | Pedranti | A01K 85/10 43/17.6 |
| 2,756,532 | A * | 7/1956 | Trester | A01K 85/08 43/42.05 |
| 2,785,496 | A * | 3/1957 | Menkens | A01K 85/10 43/42.19 |
| 2,835,068 | A * | 5/1958 | Latham | A01K 85/16 43/42.16 |
| 2,911,751 | A * | 11/1959 | Mason | A01K 85/12 43/42.06 |
| 3,010,243 | A * | 11/1961 | Dickinson | A01K 85/00 43/42.09 |
| 3,078,611 | A * | 2/1963 | Nishioka | A01K 85/08 43/42.05 |
| 3,226,875 | A * | 1/1966 | Woolums | A01K 85/10 43/42.17 |
| 3,367,059 | A * | 2/1968 | Puls | A01K 85/18 43/42.14 |
| 3,380,185 | A * | 4/1968 | Johnson | A01K 85/10 43/42.04 |
| 3,533,183 | A * | 10/1970 | Treaster | A01K 85/12 43/42.21 |
| 3,604,140 | A * | 9/1971 | Nelson | A01K 85/10 43/42.13 |
| 3,831,312 | A * | 8/1974 | Pope | A01K 85/10 43/42.17 |
| 4,133,134 | A * | 1/1979 | Cheng | A01K 85/10 43/42.06 |
| 4,135,323 | A * | 1/1979 | Esten | A01K 85/01 43/42.12 |
| 4,208,824 | A * | 6/1980 | Maxwell | A01K 85/10 43/42.19 |
| 4,257,183 | A * | 3/1981 | Arms | A01K 85/12 43/42.19 |
| 4,416,080 | A * | 11/1983 | Morrissette | A01K 85/12 43/42.2 |
| 4,616,440 | A * | 10/1986 | Millroy | A01K 85/12 43/42.06 |
| 4,617,753 | A * | 10/1986 | Pauley | A01K 85/10 43/42.09 |
| 4,637,158 | A * | 1/1987 | Reid | A01K 85/12 43/42.14 |
| 4,864,765 | A * | 9/1989 | Vanderplow | A01K 85/10 43/42.16 |
| 4,884,359 | A * | 12/1989 | Wray | A01K 85/10 43/42.19 |
| 5,076,005 | A * | 12/1991 | Rosek | A01K 85/10 43/42.14 |
| 5,084,996 | A | 2/1992 | Woodruff et al. | |
| 5,113,615 | A * | 5/1992 | Drachkovitch | A01K 85/10 43/42.19 |
| 5,133,147 | A * | 7/1992 | Benard | A01K 85/00 43/42.13 |
| 5,381,621 | A * | 1/1995 | Fuller | A01K 85/00 43/42.11 |
| 5,481,821 | A | 1/1996 | Stanley | |
| 5,634,290 | A * | 6/1997 | Johnson | A01K 85/10 289/1.5 |
| 6,018,901 | A * | 2/2000 | DuBois | A01K 85/00 43/42.13 |
| 6,508,029 | B2 * | 1/2003 | Grindley | A01K 85/12 43/42.12 |
| 6,665,977 | B2 * | 12/2003 | Hammond | A01K 85/00 43/42.13 |
| 6,820,365 | B1 * | 11/2004 | Donnelly | A01K 85/16 43/42.12 |
| 7,861,455 | B2 * | 1/2011 | Ciotlos | A01K 85/00 43/42.14 |
| 7,874,094 | B2 * | 1/2011 | Brevig | A01K 85/12 43/42.11 |
| 2007/0169398 | A1 * | 7/2007 | Taszarek | A01K 85/10 43/42.19 |
| 2009/0126256 | A1 * | 5/2009 | Gregory | A01K 85/00 43/42.09 |

FOREIGN PATENT DOCUMENTS

| | | | | |
|---|---|---|---|---|
| FR | 800231 | A * | 6/1936 | A01K 85/12 |
| FR | 806162 | A * | 12/1936 | A01K 85/12 |
| FR | 829740 | A * | 7/1938 | A01K 85/12 |
| FR | 937415 | A * | 8/1948 | A01K 85/12 |
| FR | 988334 | A * | 8/1951 | A01K 85/12 |
| FR | 992492 | A * | 10/1951 | A01K 85/10 |
| FR | 1294840 | A * | 6/1962 | A01K 85/12 |
| FR | 1524187 | A * | 5/1968 | A01K 85/10 |
| FR | 2093101 | A5 * | 1/1972 | A01K 85/10 |
| FR | 2302034 | A1 * | 9/1976 | A01K 83/00 |
| FR | 2305932 | A1 * | 10/1976 | A01K 85/01 |
| FR | 2335152 | A1 * | 7/1977 | A01K 85/01 |
| FR | 2480080 | A1 * | 10/1981 | A01K 85/01 |
| FR | 2602397 | A1 * | 2/1988 | A01K 85/10 |
| FR | 2662578 | A1 * | 12/1991 | A01K 85/10 |
| GB | 2087201 | A * | 5/1982 | A01K 85/10 |
| JP | 3178303 | U * | 9/2012 | |
| JP | 2012244967 | A * | 12/2012 | |

\* cited by examiner

ROTATING SPINNER BLADE ASSEMBLY FOR FISHING LURES

CROSS-REFERENCES TO RELATED APPLICATIONS

This application claims priority to U.S. Provisional Patent Application Ser. No. 62/134,721 filed on Mar. 18, 2015 entitled "Rotating Spinner Blade Assembly for Fishing Lures", the disclosure of which is hereby incorporated by reference.

BACKGROUND OF THE INVENTION

1. Field of the Invention

The present invention relates to fishing lures, and, more specifically, to a fishing lure with a concave-type spinner blade that generates mechanical energy to rotate a lure body to attract fish.

2. Description of the Related Art

The use of light, movement, and sometimes sound to attract fish is well known in the prior art. Many artificial lures have been created of certain shapes, colors, or markings that are intended to generate visual or auditory effects to catch fish. Some lures have even been developed that simulate the motion and appearance of live bait. Even other lures have been developed that use sound generators in an effort to attract fish. However, the majority of lures rely on visual effects to entice fish into striking the lure.

The principal difficulty with artificial lures is the need for ambient light to make them visible to their prey. Consequently, artificial lures vary in effectiveness depending on ambient light conditions and the clarity of the water. To avoid reliance upon the reflection of ambient light from the lure, self-illuminated fishing lures have been employed.

Creation of visual effects to attract fish requires a lure to rely on either ambient light or artificial light to make it visible, particularly when the lure is at depth. In the latter case, some lures generate light artificially through illuminative properties or mechanical means in an effort to catch fish. By way of example, lures have used small, electric lights attached to, or trailing close to, the lure or the lure's hook. Many problems exist when trying to use electricity-based lights in a fishing lure application. Not only must the electrical system powering the light be completely waterproof to prevent short-circuits or damage to the system, salt water is extremely corrosive to metal contacts and wires. Exposed metal corrodes at a phenomenal rate in salt-water fishing environments. Furthermore, it has been found that the weight and bulk of battery-powered fishing lure lights drastically reduces the effectiveness of the lure.

Realizing the problems with using electrical lights to visually attract a fish, some manufacturers have turned to using fluorescent materials on the lures. For example, the prior art is replete with lures that use fluorescent paint applied to the lure body, or fluorescent strips attached to the lure to create artificial light. Unfortunately, fluorescent-based lures suffer many of the same problems as lures relying on ambient light to attract fish; namely they are less effective at depth or in dark fishing conditions such as at night, or dark and rainy days.

As a further improvement over the use of fluorescent materials, lures have been introduced that utilize chemiluminescent devices, such as light sticks. These chemiluminescent devices comprise materials that, through a chemical reaction, generate light for a determinate amount of time. However, fishing lure illumination through chemiluminescent devices has its own set of problems.

Chemiluminescent materials must be attached to lures in sticks or some other form of carrying pouch. As with electricity-based lure illumination systems, the bulk and weight of chemiluminescent fishing lure lights greatly decreases the ease and effectiveness of such lures. Furthermore, chemiluminescent materials last a finite amount of time. At their expiration, they must be replaced. This leads to high costs of upkeep, material waste, and the need for a fisherperson to keep a ready stock of replacement sticks or pouches on-hand. Fishing is an activity that already requires a participant to invest in copious amounts of tackle. Requiring that he or she carry additional supplies is a tremendous disadvantage.

There is, therefore, a great need in the art for a fishing lure that does not rely on inefficient electrical or chemiluminescent systems to visually attract fish. A relatively inexpensive fishing lure that does not use wires, light bulbs, glow sticks, or batteries and is lightweight and self-contained, requiring no replacement materials, is needed within the art. The present invention meets those needs and provides additional advantages as will be discussed below.

The present invention overcomes the deficiencies of the prior art by supplying the user with a small, easy-to-use fishing lure assembly that utilizes the mechanical energy generated when trolling for fish to rotate a highly visible lure body that creates a visual effect to attract fish.

BRIEF SUMMARY OF THE INVENTION

The present invention provides a concave-type spinner blade and lure body assembly for use with fishing lures that generates mechanical energy to rotate the lure body to attract fish. The spinner blade is connected to the lure body by a connector that freely rotates around the lure's spindle. The lure body is suspended from the lure spindle by a plurality of rotational elements that are housed within the lure body. During fishing activities, a lure using the assembly is trolled, pulled through water, by a fishing line that is attached to the leading end of the fishing lure. Furthermore, the lure can be cast into the water by a fisherperson. Water is deflected from a concave spinner blade as the spinner blade passes through the water to generate mechanical energy which is transferred from the spinner blade to the lure body. The rotational mechanical energy causes the lure body to rotate thereby producing an effect that attracts fish.

In some embodiments, the lure body is a multi-faceted, colorful bead-type element that reflects or refracts light to attract fish as it rotates. The lure body can completely reflect light when the light strikes the lure body. These lure bodies generally have a mirror-like finish, or another type of finish capable of reflecting light. Other embodiments of the present invention use a lure body that partially reflect light or are semi-transparent and allow light to pass through. These embodiments are constructed of colored material, such as colored plastic or glass, that allow light only of certain colors to exit the lure body. Even other embodiments of the present invention use lure bodies that refract light into one or more patterns, such as splitting light into a rainbow pattern or separate wavelengths to visually attract fish.

The present invention is used with trolling or casting lures for fishing in bays, rivers, lakes, oceans and estuaries to catch fresh and saltwater fish which includes, but is not limited to, fall Chinook and Coho salmon.

The preceding brief description is intended to merely outline some functions and advantages of the present invention. The following disclosure will set forth other functions and advantages of the present invention along with novel features that distinguish the present invention from the prior art. It is to be understood that the following disclosure is by no means intended to limit the scope of the present invention or any of its embodiments. It is also to be understood that the accompanying illustrations are presented for descriptive purposes only and similarly are not intended to limit the scope of present invention or any of its embodiments. The following disclosure and accompanying illustrations may describe various features of novelty that characterize the invention. The invention does not reside any particular feature when taken in the singular, but in the combination of features as described herein.

Figure 1:
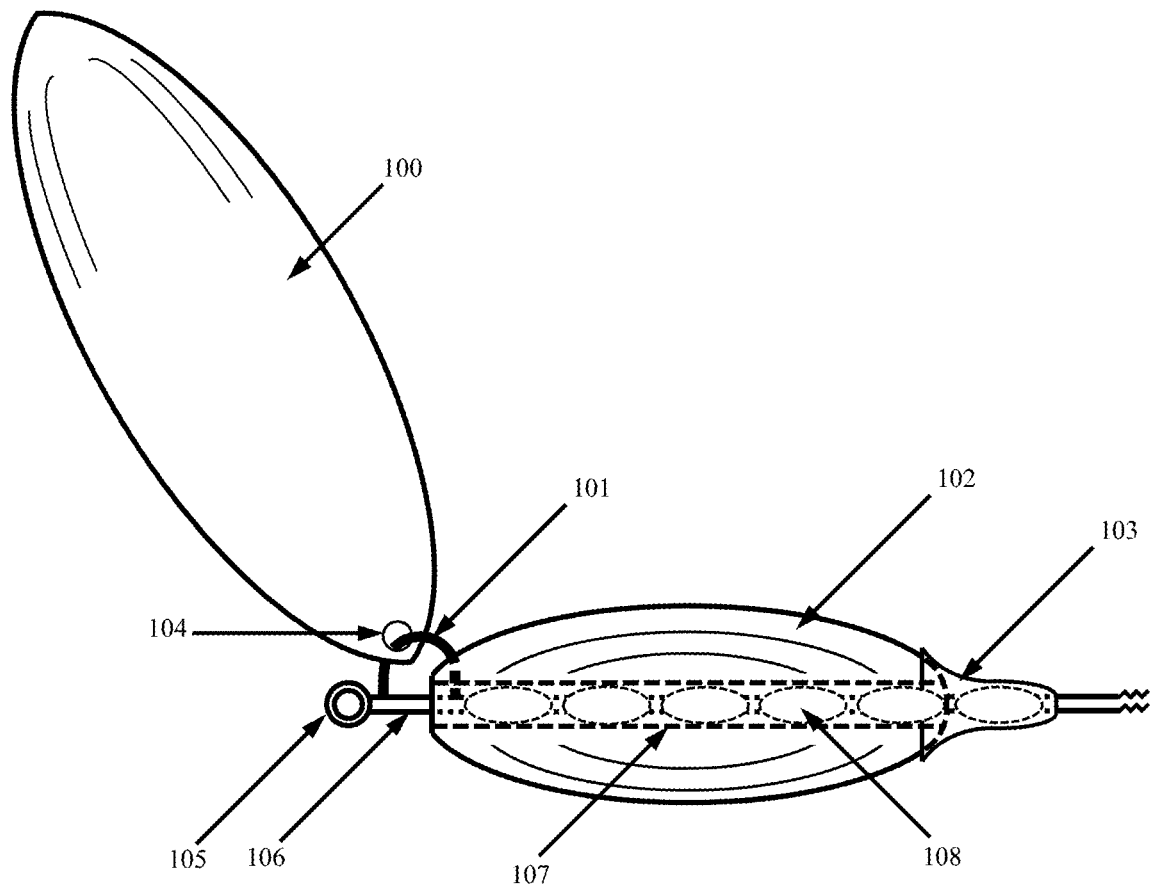
FIG. 1 is a side cross-sectional view of an exemplary fishing lure rotational spinner blade assembly with an attached spinner blade as according to one embodiment of the present invention.
Figure 2:
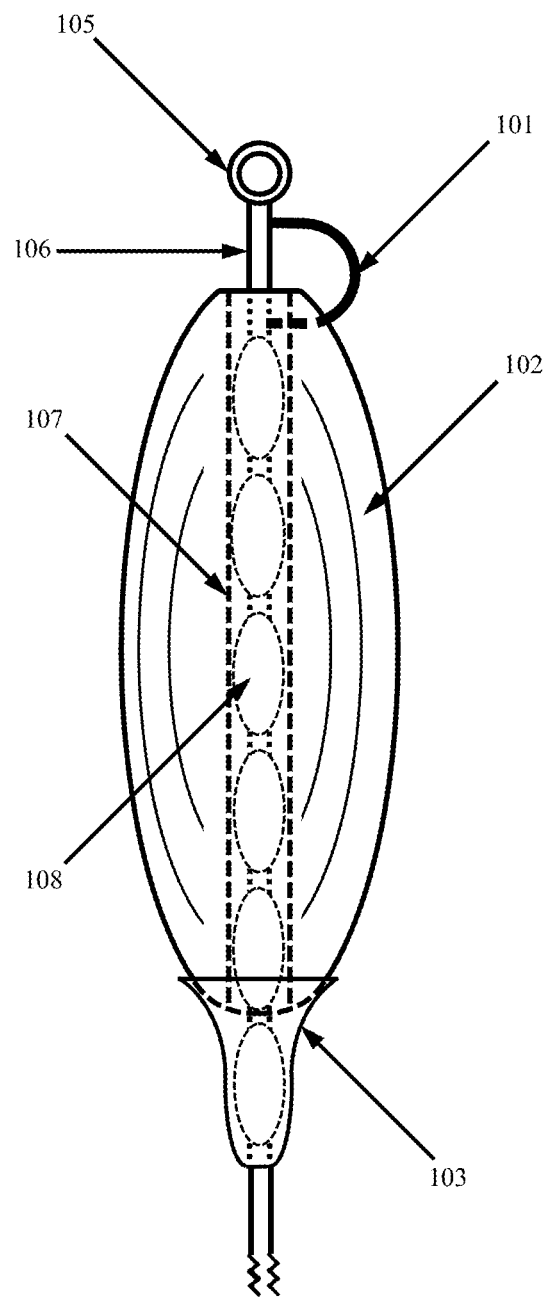
FIG. 2 is a side cross-sectional view of an exemplary fishing lure rotational spinner blade assembly as according to one embodiment of the present invention.

A further understanding of the present invention can be obtained by reference to a preferred embodiment set forth in the accompanying description. Although the illustrated embodiments are merely exemplary of apparatus for carrying out the present invention, both the organization and construction of the invention, in general, together with further objectives and advantages thereof, may be more easily understood by reference to the illustrations and the following description. The figures are not intended to limit the scope of this invention, but merely to clarify and exemplify the invention.

Certain figures contain labels, measurements, or other alphanumeric indicators. None of the aforementioned are intended to limit the scope of the invention, but are included merely to clarify and exemplify the invention.

DETAILED DESCRIPTION OF THE INVENTION

In the following detailed description, reference is made to the accompanying images that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by appended claims, appropriately interpreted, along with the full range of equivalents to which the claims are entitled.

Further, the purpose of the Abstract of the Disclosure herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the apparatus include the discussed feature, advantage or mode of operation. The following descriptions of the preferred embodiments are merely exemplary in nature and are in no way intended to limit the invention, its application, or use.

For the purpose of clarity, all like elements will have the same numbering and designations in each of the images. The terms "rotating spinner blade assembly for fishing lures", "fishing lure rotational spinner blade assembly", "spinner blade assembly", "blade assembly", "assembly", "present invention", and "invention" may be used interchangeably. In addition to the functions, features, components, and abilities of the apparatus already discussed in this specification, the present invention may also have, but not be limited to, the following features contained within the description set forth herein.

Several preferred embodiments of the fishing lure rotational spinner blade assembly are discussed in this section. However, the invention is not limited to these embodiments. A fishing lure rotational spinner blade assembly, as according to the present invention, is any components of a fishing lure that allow a body of the lure to rotate around rotational elements within the body. The rotational elements allow for the passage of a lure spindle through each rotational element.

Referring now to FIGS. 1-4, that will be discussed together, there is illustrated an embodiment of the fishing lure rotational spinner blade assembly that can be used with fishing lures to attract fish. In some embodiments of the present invention, the fishing lures are trolling or casting lures intended to be used in bays, rivers, lakes, oceans, and estuaries to catch a wide variety of fresh and saltwater fish including, but not limited to, fall Chinook and Coho salmon. The fishing lure to which the assembly is attached is pulled forward, trolled, by a fishing line that is attached to a fishing lure eye (105) that is located at the front of the lure. The assembly operates by allowing a concave-type of spinner blade (100) to cause a lure body (102) to rotate by transferring mechanical energy from the spinner blade (100) to the lure body (102) as the spinner blade (100) passes through water. In some embodiments, the lure body (102) is a multi-faceted, colorful bead-type element that reflects or refracts light to attract fish as it rotates. Some embodiments of the present invention use a lure body (102) that completely reflects light when light strikes the lure body (102). These lure bodies (102) generally have a mirror-like finish or a finish capable of reflecting light. Other embodiments of the present invention use lure bodies (102) that partially reflect light, or are semi-transparent and allow light to pass through. These latter embodiments can be constructed of a colored material, such as colored plastic or glass, so that the light transmitted through the lure body (102) is colored thereby creating an additional visual effect to attract fish. Furthermore, some embodiments of the present invention use lure bodies (102) that refract light into one or more patterns, such as splitting light that strikes the lure body (102) into a rainbow pattern or separate wavelengths.

Angular deflection of water against the spinner blade (100) as the fishing lure is trolled or reeled generates the mechanical energy that is transferred to the lure body (102) by way of a spinner blade connector (101) that is connected to the spinner blade (100).

Figure 8:
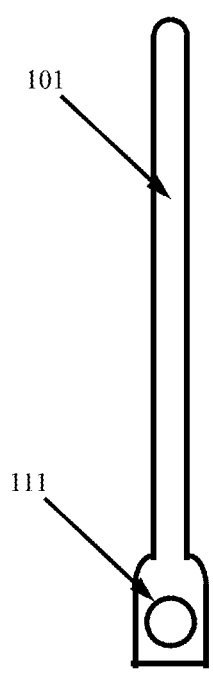
FIG. 8 is a front elevation view of an exemplary spinner blade connector as according to one embodiment of the present invention.
Figure 9:
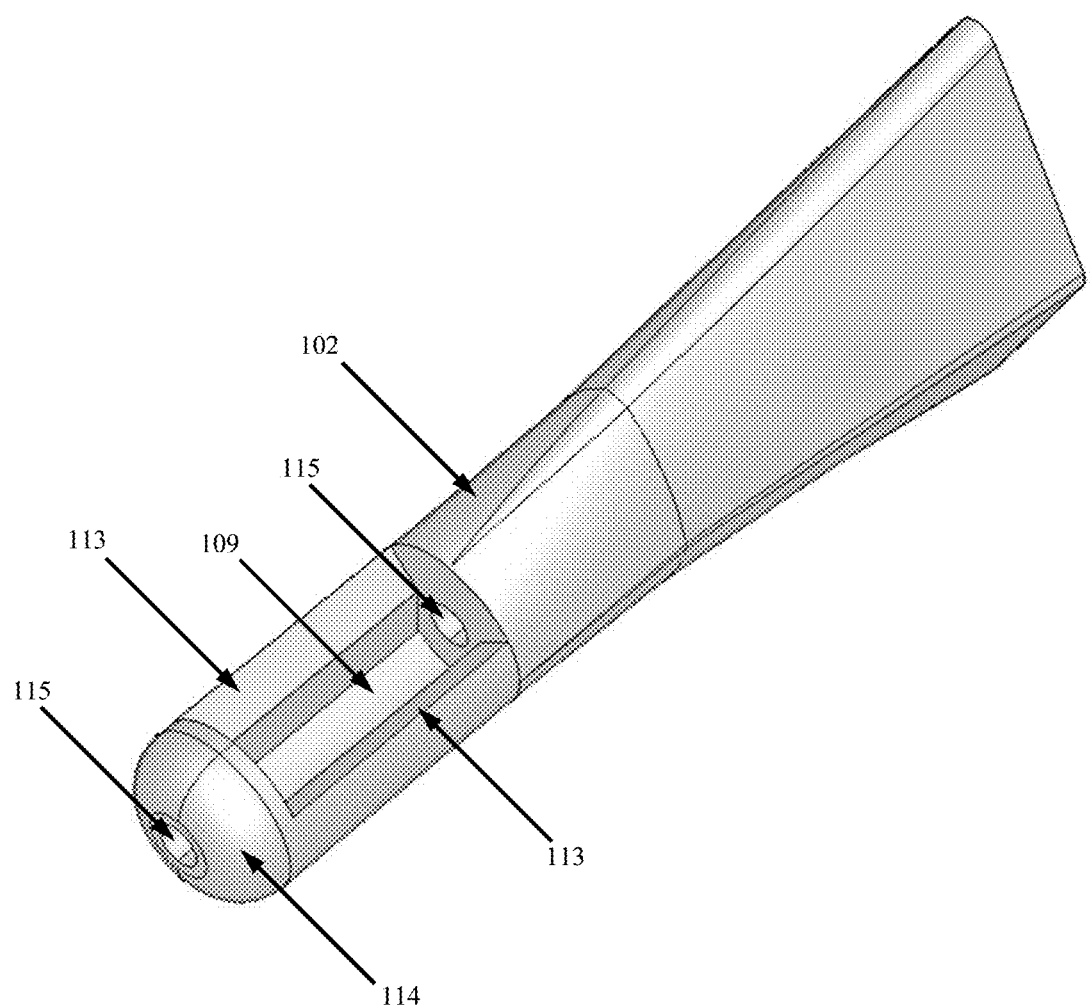
FIG. 9 is a handwritten description of an exemplary lure head as according to one embodiment of the present invention.
Figure 10:
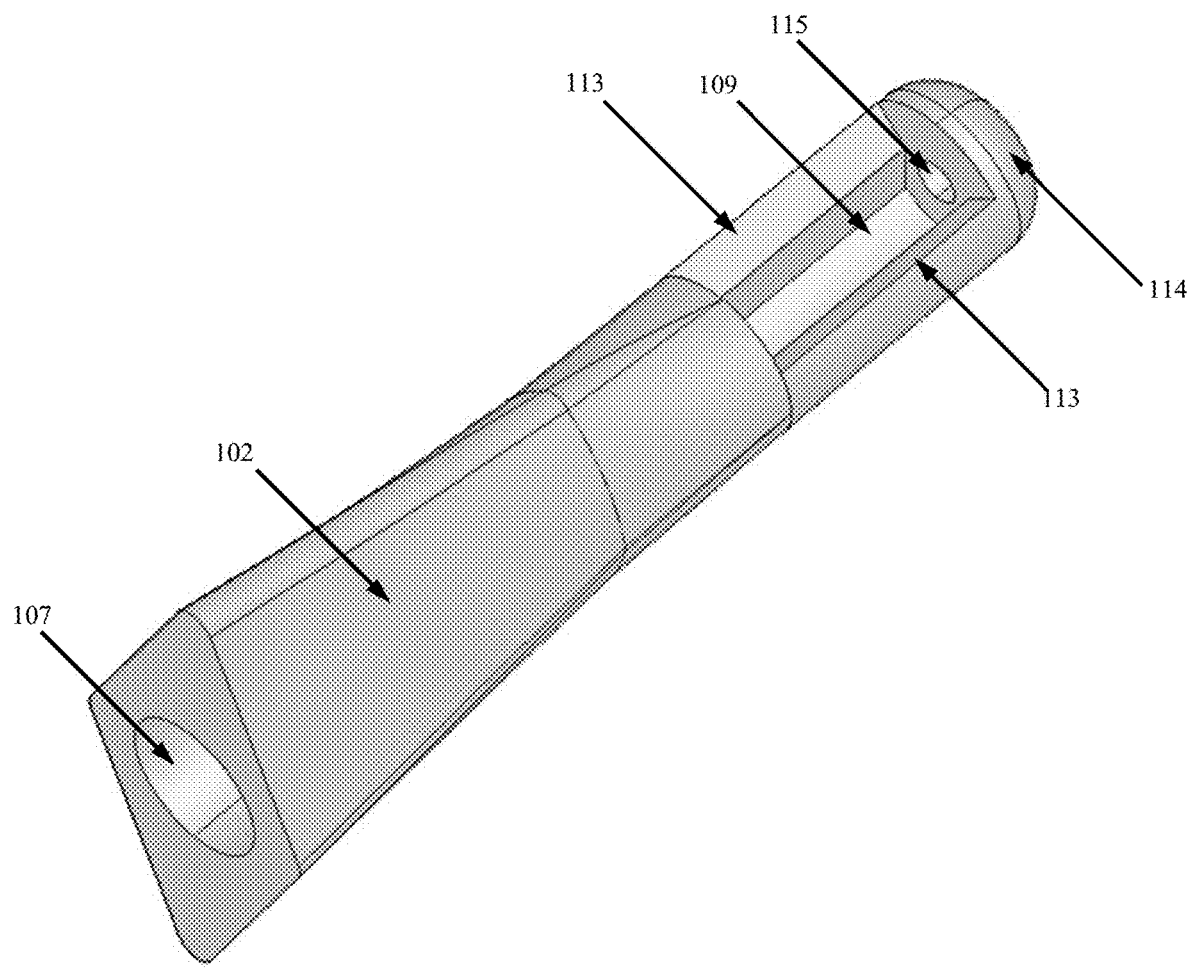
FIG. 10 is a list of features of an exemplary lure head as according to one embodiment of the present invention.
Figure 11:
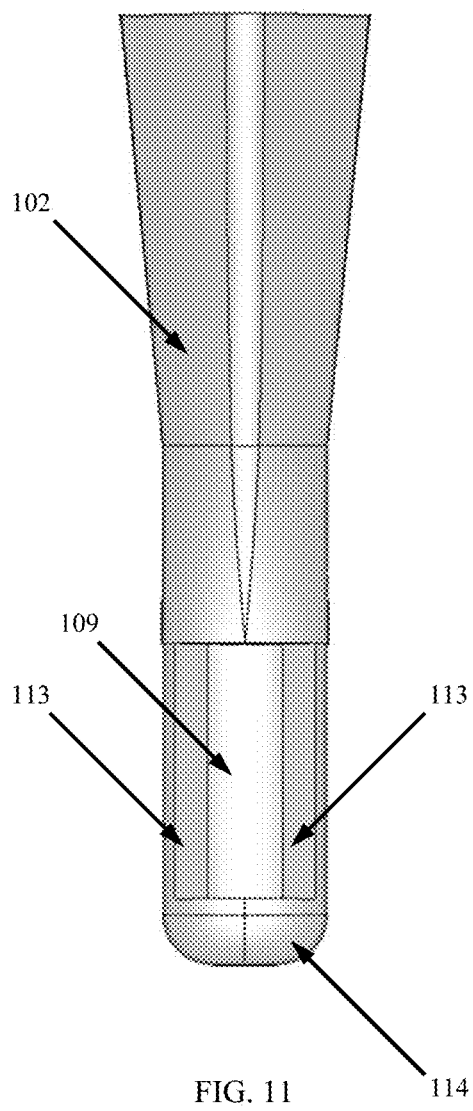
FIG. 11 is a front view of an exemplary lure head as according to one embodiment of the present invention.
Figure 12:
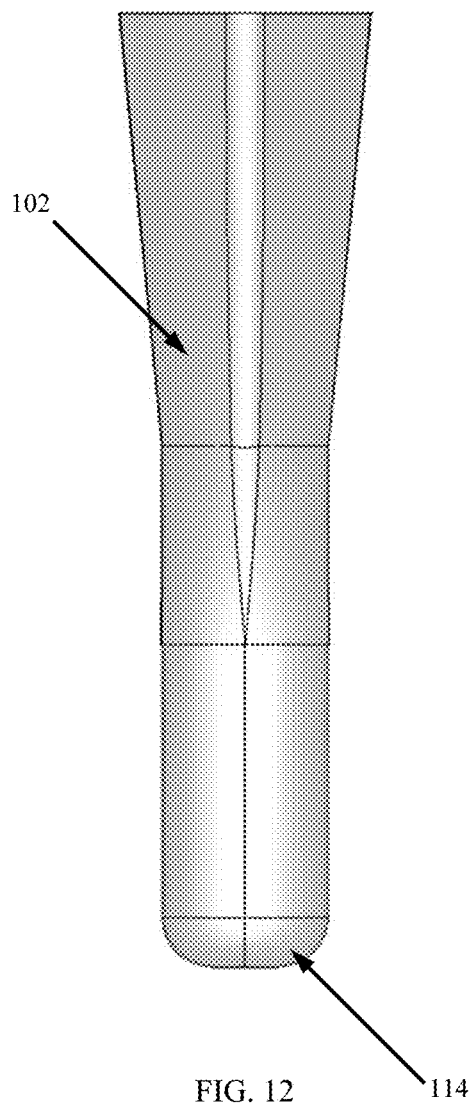
FIG. 12 is a bottom perspective view of an exemplary lure head as according to one embodiment of the present invention.
Figure 13:
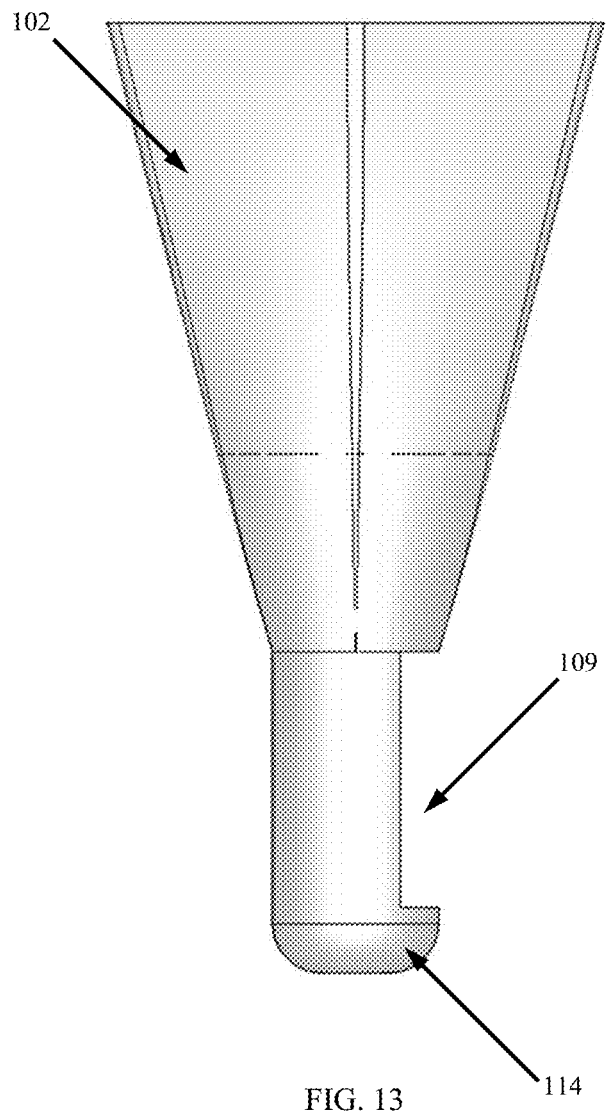
FIG. 13 is a bottom view of an exemplary lure head as according to one embodiment of the present invention.
Figure 14:
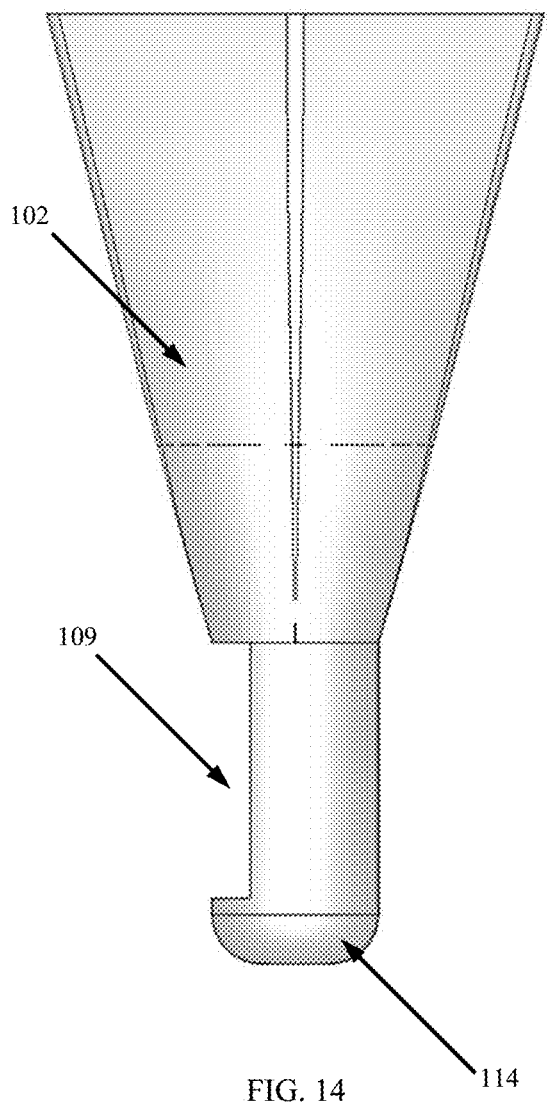
FIG. 14 is a back view of an exemplary lure head as according to one embodiment of the present invention.
Figure 15:
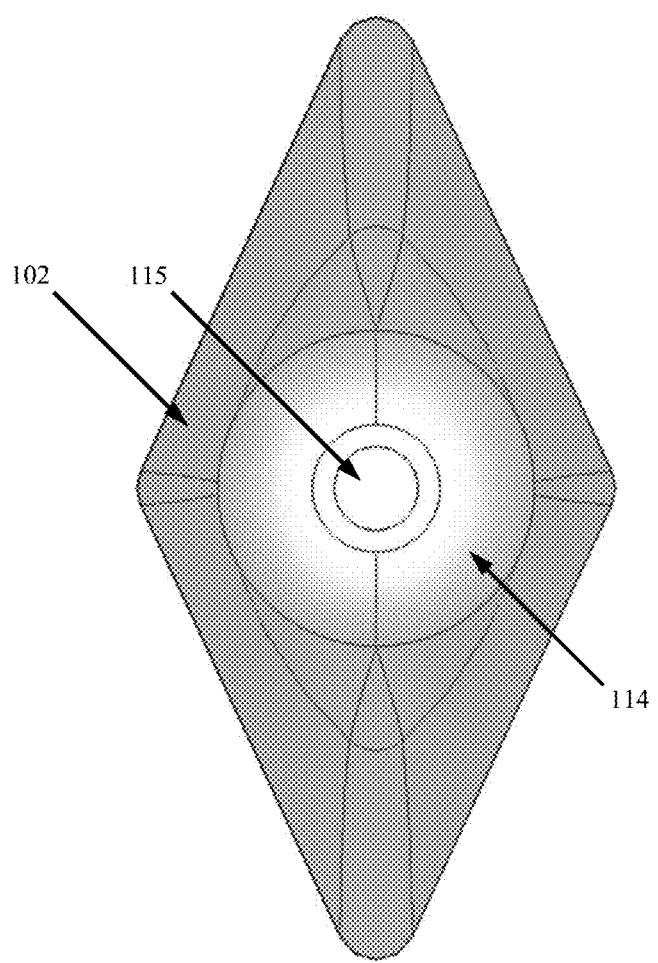
FIG. 15 is a left view of an exemplary lure head as according to one embodiment of the present invention.
Figure 16:
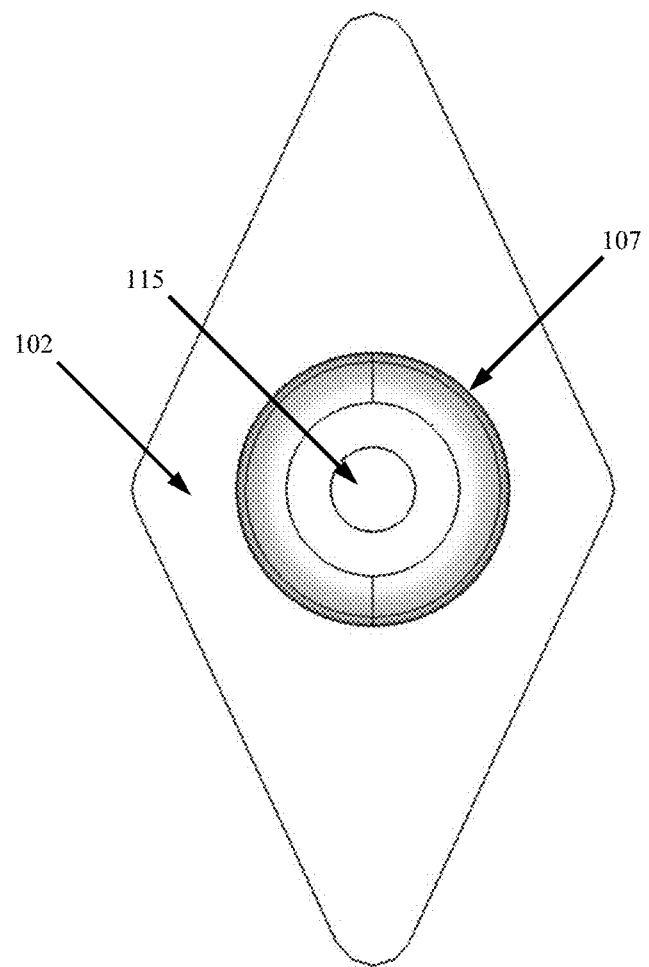
FIG. 16 is a top perspective view of an exemplary lure head as according to one embodiment of the present invention.

The spinner blade connector (101) can be a clevis-type of connector with eyelets (FIG. 8, (111)) that allow a lure spindle (106) to pass through the connector (101). In alternative embodiments, the spinner blade connector (101) can be a non-clevis type of connector provided the connector (101) contacts the lure body (102) so that it performs the function of securing the spinner blade (100) to the lure spindle (106).

Figure 3:
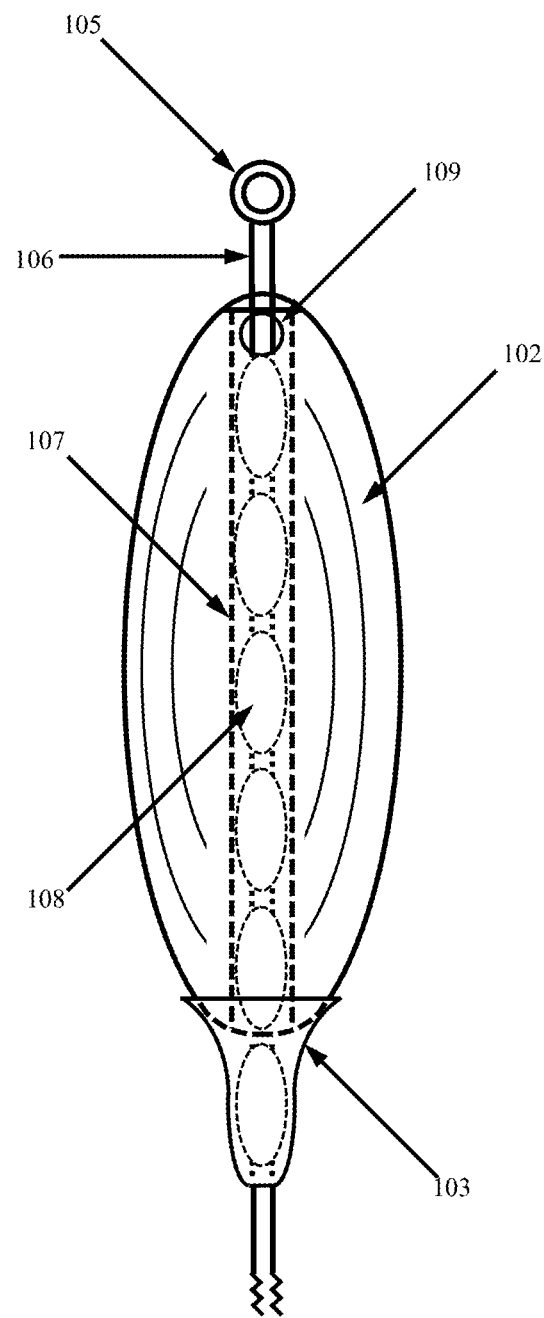
FIG. 3 is a top cross-sectional view of an exemplary fishing lure rotational spinner blade assembly as according to one embodiment of the present invention.
Figure 4:
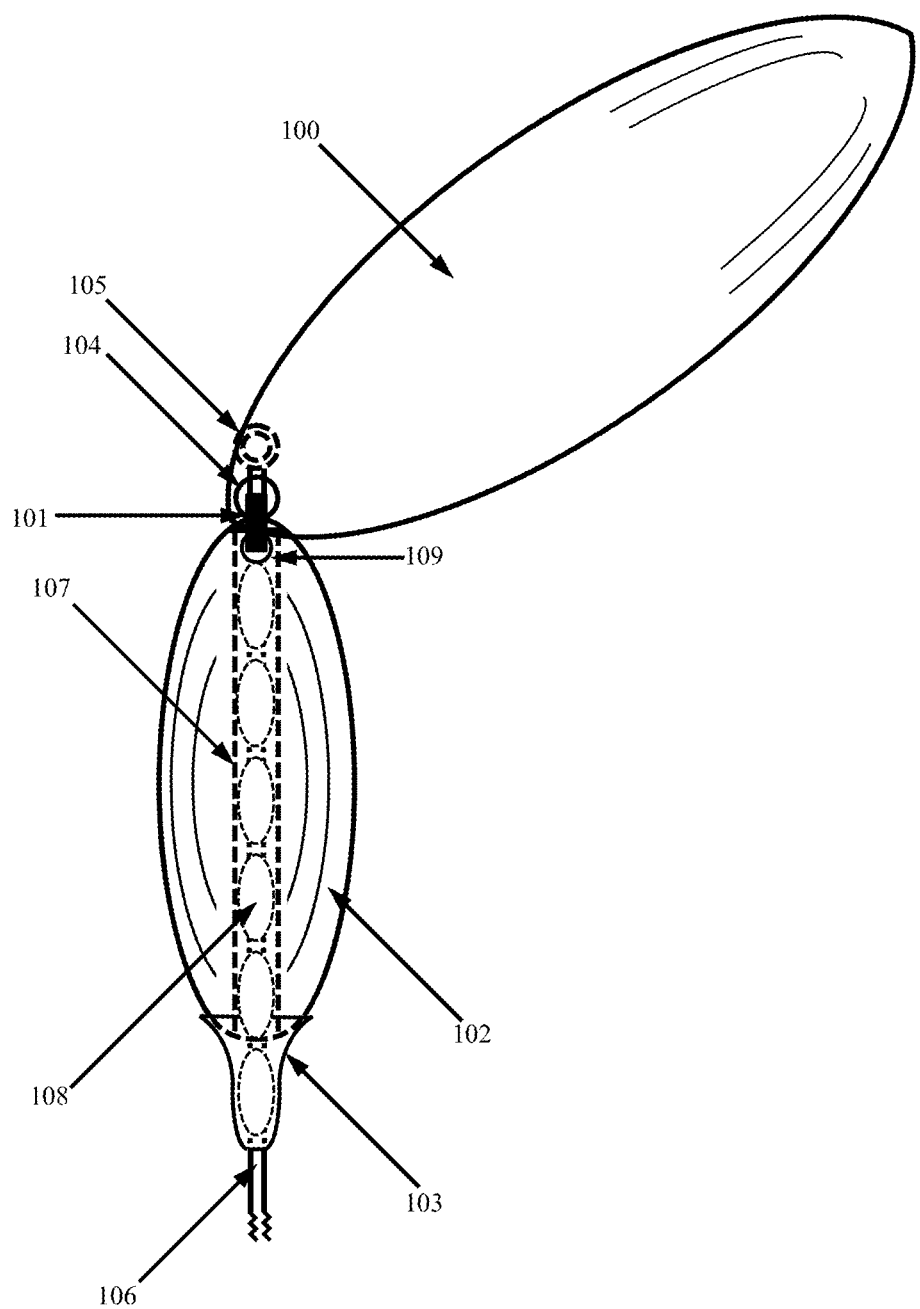
FIG. 4 is a top cross-sectional view of an exemplary fishing lure rotational spinner blade assembly with an attached spinner blade as according to one embodiment of the present invention.

In some embodiments of the present invention, the spinner blade (100) is aligned with a spinner blade connector area (FIGS. 3, 4 (109)) so that the spinner blade (100) does not block line-of-sight views to the rotating lure body (102). The alignment between the spinner blade connector area (FIGS. 3, 4 (109)) and the spinner blade (100) also allows the spinner blade (100) to strike the widest portion of the lure body (102) at certain times during fishing activities. The raising or lowering of a fishing rod when trying to find the bottom of a fishing area is a time when the spinner blade (100) could strike the widest portion of the lure body (102).

The body of the spinner blade connector (101) passes through a spinner blade opening (104) with each end of the connector (101) being attached to the lure spindle (106) in a manner that allows the connector (101) to freely rotate around the lure spindle (106). The eyelets (FIG. 8 (111)) of the spinner blade connector (101) are large enough to allow for the free rotation of the spinner blade connector (101) around the lure spindle (106).

The spinner blade opening (104) is large enough so that the spinner blade (100) can travel through water at an angle relative to the rest of the fishing lure. The frequency of rotation of the spinner blade (100) is identical to the frequency of rotation of the lure body (102) due to the spinner blade connector (101) passing through, or directly contacting, the lure body (102). In some embodiments of the present invention, the spinner blade connector (101) is inserted into a spinner blade connector area (FIGS. 3, 4 (109)). In other embodiments of the present invention, the spinner blade connector (101) passes through a groove formed in the leading edge of the lure body (102).

The rotation of the spinner blade (100) and the lure body (102) creates a visual effect that attracts fish. Light passing through the water strikes the spinner blade (100) and the lure body (102) and is transmitted through, or reflected or refracted from, the spinner blade (100) or lure body (102) as the spinner blade (100) and lure body (102) are pulled through the water. The transmission, reflection or refraction of light during rotation creates the visual effect that attracts fish. The speed of rotation of the spinner blade (100) and lure body (102) can be adjusted by using lure bodies (102) of differing diameters. The larger the diameter of the lure body (102), the slower the rotational speed. The smaller the diameter of the lure body (102), the faster the speed of rotation. It is be desirable in some embodiments of the present invention to use lure bodies (102) of a certain diameter to create a rotational frequency that transmits, reflects or refracts light in a pattern or frequency that is desirable to catch a certain species of fish.

Within the lure body (102) resides a plurality of rotational elements (108). The rotational elements (108) are housed within a rotational element housing (107) within the lure body (102). The rotational elements (108) act as bearings that keep the lure body (102) separated from the lure spindle (106), but allow the lure body (102) to freely rotate around the lure spindle (106). The rotational elements (108) are roughly the same shape as common bearings found inside of a wheel that rotates around an axle.

The rotational element housing (107) is an opening extending through the lure body (102) that is of sufficient size to accommodate at least some of the rotational elements (108) and the lure spindle (106) that passes through the rotational elements (108). Each rotational element (108) has an opening through which the lure spindle (106) passes. These rotational elements (108) act as bearings that contact both the lure body (102) and the lure spindle (106) and allow for the free rotation of the lure body (102) during fishing activities. Some embodiments of the present invention use rotational elements (108) that are elongated or oval in shape. Other embodiments of the present invention use rotational elements (108) that are round or spheres. The rotational elements (108) may be of any shape so long as the lure body (102) is able to rotate around the elements (108). Furthermore, a combination of differently shaped rotational elements (108) can be used with various embodiments of the present invention provided that the combination of rotational elements (108) allow the lure body (102) to rotate during fishing activities.

A rotational element retainer (103) is used to retain the rotational elements (108) within the lure body (102). The rotational elements (108) can slide along the lure spindle (106), but are kept within the lure body (102) so that the lure body (102) freely rotates around the rotational elements (108) by the rotational element retainer (103). The rotational elements (108) are kept in place so that they may act as bearings and reduce friction between the lure body (102) and the lure spindle (106). Each rotational element (108) behaves like a bearing by allowing for free rotation of the lure body (102) around the long axis of the lure spindle (106). The rotational element retainer (103) has a large opening at one end that allows a portion of, or an entire, rotational element (108) to extend into the retainer (108). The rotational element retainer (103) has a small opening at the opposite end that is sufficient size for the lure spindle (106) to pass through.

The rotational element retainer (103) is hydrodynamically shaped so that water flows around the lure body (102), then around the rotational element retainer (103) without creating undue turbulence. In some embodiments of the present invention, the large opening of the rotational element retainer (103) is cup-shaped to house one end of the lure body (102). Housing a portion of the lure body (102) within the rotational element retainer (103) further enhances the hydrodynamic properties of the present invention and lessens any unwanted disturbances to the water that may scare away fish.

Figure 5:
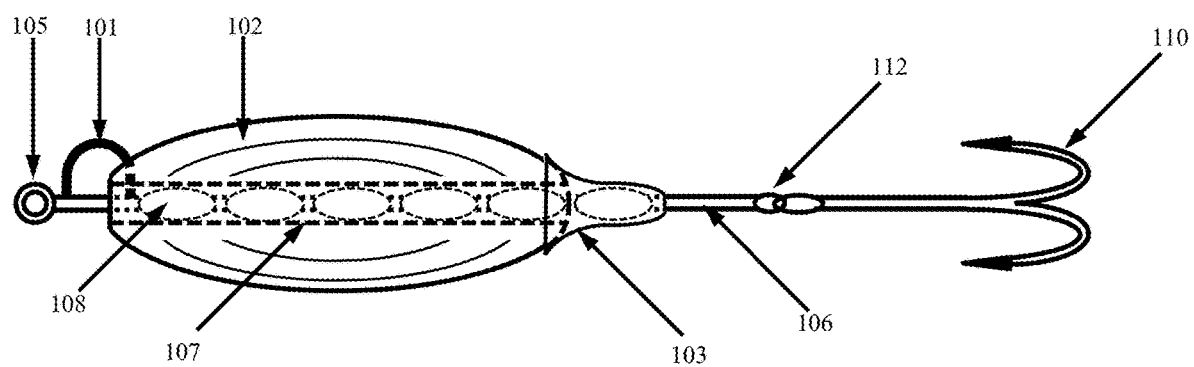
FIG. 5 is a side cross-sectional view of an exemplary fishing lure with a rotational spinner blade assembly as according to one embodiment of the present invention.
Figure 6:
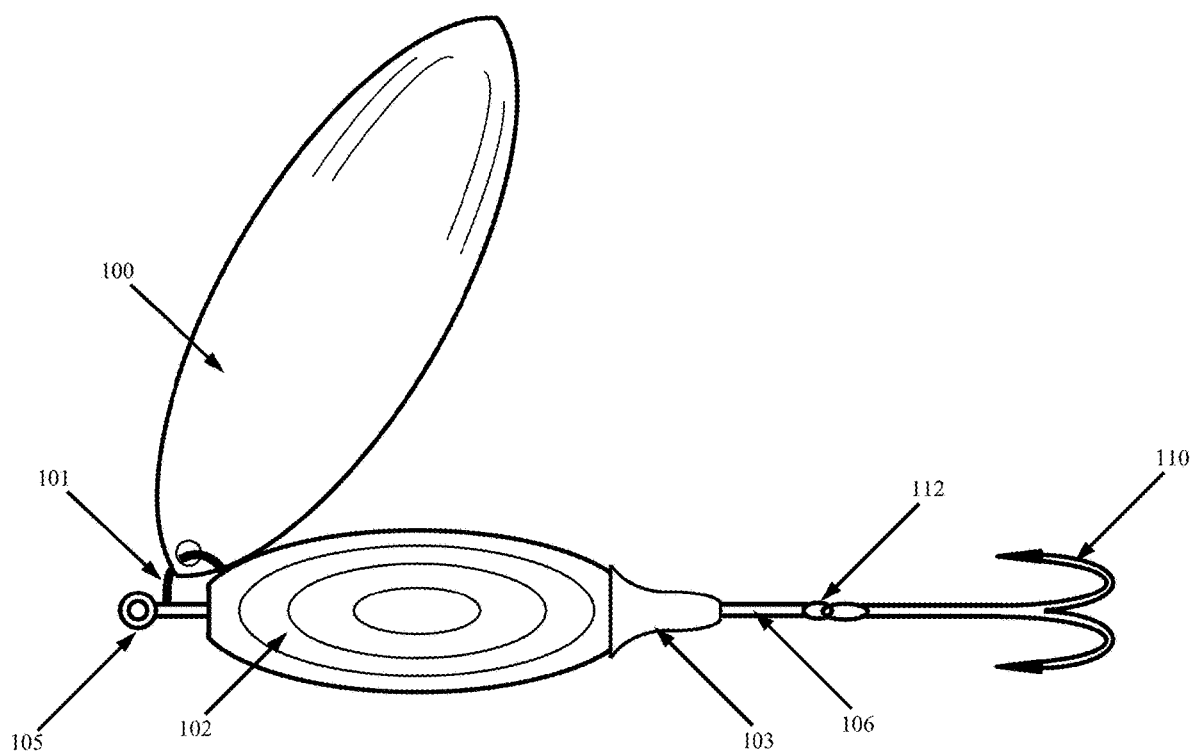
FIG. 6 a side elevation view of an exemplary fishing lure with a rotational spinner blade assembly and attached spinner blade as according to one embodiment of the present invention.

During fishing activities, the small opening of the rotational element retainer (103) may contact the forward end of a lure connection (FIGS. 5, 6 (112)). The lure connection (FIGS. 5, 6 (112)) is larger than the small opening of the rotational element retainer (103) thereby preventing the rotational element retainer (103) from sliding further down the lure spindle (106) as the lure is pulled through the water. Furthermore, during fishing activities, it is possible for the lure body (102), rotational elements (108), spinner blade (100), and the spinner blade connector (101) to all slide down the lure spindle (106) toward the lure connection (FIGS. 5, 6 (112)) due to the force of the water acting on the lure.

Referring now to FIGS. 5, 6, that will be discussed together, there is illustrated an exemplary fishing lure rotational spinner blade assembly with an attached fishing hook (110) as according to one embodiment of the present invention. The fishing hook (110) is connected to the assembly by way of a lure connection (112) that allows the fishing hook (110) to pivot at various angles relative to the lure spindle (106). The fishing hook (110) is allowed to pivot relative to the lure spindle (106) so that it can hang down at an angle from the rest of the lure and can be more easily struck by fish. If the fishing hook (110) were not allowed to pivot, the fishing hook (110) would be held in a rigid position and it would be more difficult for fish to strike the hook (110) resulting in fewer caught fish. The fishing hook (110) is the portion of the lure that attaches fish to the lure and prevents them from escaping after striking the lure. In some embodiments, the fishing hook (110) is a treble hook with barbs at the end of each hook (110) to prevent the hook (110) from sliding out of the fish.

Figure 7:
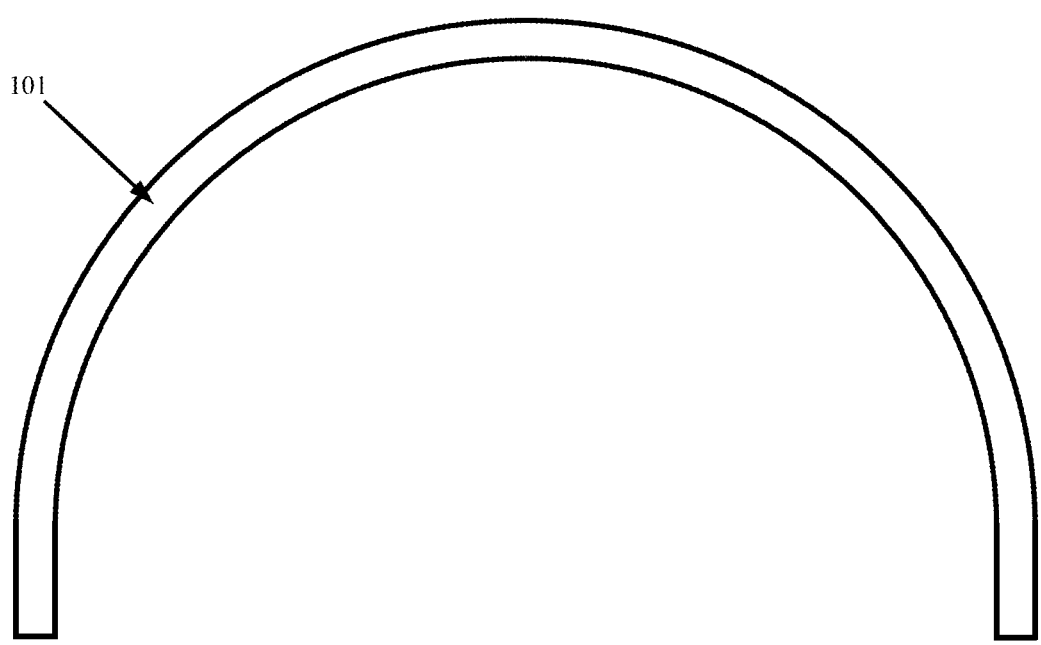
FIG. 7 is a side elevation view of an exemplary spinner blade connector as according to one embodiment of the present invention.

Referring now to FIGS. 7, and 8, that will be discussed together, there is illustrated an exemplary spinner blade connector (101) as according to one embodiment of the present invention. The spinner blade connector (101) can be a clevis-type of connector that attaches to the lure spindle (FIGS. 1-6 (106)) at either end. The spinner blade connector (101) is roughly u-shaped so that the spinner blade (FIGS. 1-6 (100)) can project from a fishing lure at angles relative to the lure body (FIGS. 1-6, 9-16 (102)). The projection of the spinner blade (FIGS. 1-6 (100)) from the fishing lure at angles allows the spinner blade (FIGS. 1-6 (100)) to deflect water in a manner that generates rotational energy within the spinner blade (FIGS. 1-6 (100)) and causes the spinner blade (FIGS. 1-6 (100)) and the lure body (FIGS. 1-6, 9-16 (102)) to rotate as the lure is pulled through the water.

The spinner blade connector (101) has connector eyelets (111) through which the lure spindle (FIGS. 1-6 (106)) passes. The connector eyelets (111) are of sufficient size so that the spinner blade connector (101) can rotate freely around the lure spindle (FIGS. 1-6 (106)) during fishing activities.

In one embodiment of the present invention, one end of the spinner blade connector (101) connects to the lure spindle (FIGS. 1-6 (106)) just behind the lure eye (FIGS. 1-6 (105)) and the other end of the spinner blade connector (101) connects to the lure spindle (FIGS. 1-6 (106)) within the lure body (FIGS. 1-6, 9-16 (102)). In this embodiment, the spinner blade connector (101) passes into the lure body (FIGS. 1-6, 9-16 (102)) through a spinner blade connector area (FIG. 3, 9-16 (109)) that is located at one end of the lure body (FIGS. 1-6, 9-16 (102)). By passing through the spinner blade connector area (FIG. 3, 9-16 (109)) then attaching to the lure spindle, (FIGS. 1-6 (106)) within the lure body (FIGS. 1-6, 9-16 (102)), the spinner blade connector (101) secures the lure body (FIGS. 1-6, 9-16 (102)) to the spinner blade (FIGS. 1-6 (100)) and prevents the two from becoming separated. This ensures that the spinner blade (FIGS. 1-6 (100)) will always cause the lure body (FIGS. 1-6, 9-16 (102)) to rotate when fishing.

In another embodiment of the present invention, one end of the spinner blade connector (101) connects to the lure spindle (FIGS. 1-6 (106)) just behind the lure eye (FIGS. 1-6 (105)) and the other end of the spinner blade connector (101) connects to the lure spindle (FIGS. 1-6 (106)) immediately in front of the lure body (FIGS. 1-6, 9-16 (102)). In this embodiment of the present invention, the lure body (FIGS. 1-6, 9-16 (102)) has a groove in its forward surface that houses the spinner blade connector (101). The groove is shaped to prevent slippage of the spinner blade connector (101) so that the spinner blade connector (101) causes the lure body (FIGS. 1-6, 9-16 (102)) to rotate when the lure is pulled through the water.

Referring now to FIGS. 9-16, there is shown an alternative fishing lure rotational spinner blade assembly body as according to an embodiment of the present invention. The alternative body (102) is a one-piece assembly with a lure spindle hole (115) running along the longitudinal axis of the front part of the body (102). The lure spindle hole (115) is used to house a lure spindle (FIGS. 1-6 (106)) as it passes through the head portion of the body (102).

The lure spindle hole (115) extends through the spinner blade connector area (FIG. 3, 9-16 (109)) and connects to the rotational element housing (107) further back in the body (102). In this embodiment of the present invention, the rotational element housing (107) contains rotational elements (FIGS. 1-5 (108)) that allow the body (102) to spin around its longitudinal axis as the embodiment passes through water.

On either side of the spinner blade connector area (FIG. 3, 9-16 (109)) are angled connector area walls (113). The angled connector walls (113) allow the spinner blade connector (FIGS. 1-2, 4-8 (101)) to rotate through an arc when it is connected to the lure spindle (FIGS. 1-6 (106)). In this embodiment, the spinner blade connector (FIGS. 1-2, 4-8 (101)) is contained in the spinner blade connector area (FIG. 3, 9-16 (109)) and can deflect in a clockwise or counterclockwise manner until it contacts the angled connector area walls (113). The angled connector area walls (113) act as a positive stop to arrest the rotation of the spinner blade connector (FIGS. 1-2, 4-8 (101)). The angled connector area walls (113) have a flattened surface that provides support to the spinner blade connector (FIGS. 1-2, 4-8 (101)). This support prevents the spinner blade connector (FIGS. 1-2, 4-8 (101)) from becoming damaged or bent from the forces acting upon it. The flattened surfaces also allow the hydrodynamic force of the water acting on the spinner blade (FIGS. 1-6 (100)) to be transmitted to the body (102) of the lure thereby causing it to rotate.

A domed end cap (114) is provided at one end of the body (102) to allow the lure to more efficiently pass through the water during fishing activities. The domed end cap (114) reduces drag upon the body (102) and forms the head-end of the body (102)

As set forth in this description and the attached images, a new fishing lure rotational spinner blade assembly has been developed that improves upon conventional fishing lures. The various embodiments of the improved fishing lure rotational spinner blade assembly described herein can be used in a wide variety of fishing applications including trolling or casting for many types of large fresh and saltwater game fish in bays, rivers, oceans, and lakes.

The preceding exemplary embodiments are not intended to be limiting, but are merely illustrative for the possible uses of the fishing lure rotational spinner blade assembly.

Although certain example apparatus and articles of manufacture have been described herein, the scope of coverage of this patent is not limited thereto. On the contrary, this patent covers all apparatus and articles of manufacture fairly falling within the scope of the invention either literally or under the doctrine of equivalents.

With respect to the above description then, it is to be realized that the optimum dimensional relationships for the components of the fishing lure rotational spinner blade assembly, to include variations in size, materials, shape, form, function and the manner of operation, and use, are deemed readily apparent and obvious to one skilled in the art, and all equivalent relationships to those illustrated in the images and described in the specification are intended to be encompassed by the fishing lure rotational spinner blade assembly.

Directional terms such as "front", "back", "in", "out", "downward", "upper", "lower", "top", "bottom", "lateral", "vertical" and the like have been used in the description. These terms are applicable to the embodiments shown and described in conjunction with the images. These terms are merely used for the purpose of description in connection with the images and do not necessarily apply to the positions in which the fishing lure rotational spinner blade assembly may be used.

Therefore, the foregoing is considered as illustrative only of the principles of the fishing lure rotational spinner blade assembly. Further, since numerous modifications and changes will readily occur to those skilled in the art, it is not desired to limit the fishing lure rotational spinner blade assembly to the exact construction and operation shown and described, and accordingly, all suitable modifications and equivalents may be resorted to, falling within the scope of the fishing lure rotational spinner blade assembly. While the above description describes various embodiments of the present invention, it will be clear that the present invention may be otherwise easily adapted to fit any configuration where a fishing lure rotational spinner blade assembly is desired or required.

As various changes could be made in the above constructions without departing from the scope of the invention, it is intended that all matter contained in the above description or shown in the accompanying images shall be interpreted as illustrative and not in a limiting sense.

What is claimed is:

1. An apparatus comprising:
   a rotating lure body that is used with a fishing lure that reflects or refracts ambient light to visually attract fish, wherein the lure body houses a plurality of rotational elements, the rotational elements comprising bearings each having a self-bounded outer surface housed entirely within the lure body, the bearings allowing the lure body to freely rotate around the rotational elements and around a lure spindle, a portion of the lure spindle passing through each of the plurality of rotational elements;
   a spinner blade, wherein the spinner blade is connected to a spinner blade connector, the spinner blade connector being connected to the lure spindle at a location that is offset along a length of the lure spindle from the portion of the lure spindle that passes through each of the plurality of rotational elements, and the spinner blade connector contacts the lure body; where
   the spinner blade rotates around the fishing lure when the fishing lure is pulled through the water, rotational energy from the spinner blade being transferred to the lure body by the spinner blade connector thereby causing the lure body to also rotate.

2. The apparatus of claim 1, wherein the lure body is a plastic or glass bead-type body with one or more flat sides that reflect or refract ambient light.

3. The apparatus of claim 1, wherein the spinner blade is a concave-type spinner blade that angularly deflects water to generate the rotational energy.

4. The apparatus of claim 1, wherein the spinner blade connector passes into the lure body through an opening within the lure body.

5. The apparatus of claim 1, further comprising a rotational element retainer that keeps the rotational elements within the lure body when fishing.

6. The apparatus of claim 5, wherein the rotational element retainer has an opening that allows all or a portion of at least one of said plurality of rotational elements to enter the rotational element retainer.

7. A fishing lure rotational spinner blade assembly comprising:
   a lure body that reflects or refracts ambient light during fishing activities, the lure body being constructed from a transparent colored material or a non-transparent reflective material, the lure body being separated from a lure spindle by rotational elements contained within the lure body, the rotational elements acting as bearings each having a self-bounded outer surface housed entirely within the lure body, the bearings allowing free rotation of the lure body around the rotational elements and around the lure spindle, the rotational elements being housed within a spindle passage that is located within the lure body, a portion of the lure spindle passing through each of the rotational elements,
   a spinner blade able to angularly deflect water passing over the spinner blade so that a rotational force is generated, the spinner blade providing the rotational force to rotate the lure body when a fishing lure employing the assembly is pulled through water, the rotational force being transferred to the lure body by way of a spinner blade connector, the spinner blade connector being connected to the lure spindle and able to rotate around the lure spindle when the spinner blade and lure body rotate, wherein the spinner blade connector is connected to the lure spindle at a location that is offset along a length of the lure spindle from the portion of the lure spindle that passes through each of the rotational elements, and the rotational elements housed within the lure body.

8. The fishing lure rotational spinner blade assembly of claim 7, wherein the lure body has one or more flat sides that reflect or refract ambient light.

9. The fishing lure rotational spinner blade assembly of claim 7, wherein the lure body is an elongated, colored plastic bead.

10. The fishing lure rotational spinner blade assembly of claim 7, wherein the rotational elements are round or elongated beads that are attached to the lure spindle.

11. The fishing lure rotational spinner blade assembly of claim 7, wherein the spinner blade connector is a clevis-type device with eyelets at each end that allow the lure spindle to pass through.

12. The fishing lure rotational spinner blade assembly of claim 7, further comprising a rotational element retainer that contacts the lure body, is hydrodynamically shaped, and allows at least part of one rotational element of said plurality of rotational elements to be housed within.

13. The fishing lure rotational spinner blade assembly of claim 7, further comprising a fishing hook attached to the lure spindle by a lure connection, the lure connection allowing the fishing hook to pivot at angles relative to the lure spindle.

14. A fishing lure comprising:
a lure body,
a lure eye used to connect a fishing line to the fishing lure,
a lure spindle that extends the length of the fishing lure and is connected to the lure eye,
a spinner blade that rotates around the lure spindle when the fishing lure is pulled through water,
a spinner blade connector having opposed ends and that causes the lure body to rotate with the spinner blade, wherein each end of the spinner blade connector is connected to the lure spindle and wherein the spinner blade connector can rotate around the lure spindle when the lure is pulled through the water,
a plurality of rotational elements comprising bearings each having a self-bounded outer surface housed entirely within the lure body, the bearings contained within a spindle passage within the lure body that allow the lure body to rotate around the bearings and around the lure spindle, a portion of the lure spindle passing through each of the plurality of rotational elements, wherein said each end of the spinner blade connector is connected to the lure spindle at a location that is offset along a length of the lure spindle from the portion of the lure spindle that passes through each of the plurality of rotational elements,
a lure connection that connects the lure spindle to a fishing hook and allows the fishing hook to pivot relative to the lure spindle, and
a rotational element retainer that keeps the rotational elements within the lure body during fishing activities.

15. The fishing lure of claim 14, wherein the spinner blade is shaped so that water deflects off of the spinner blade at an angle that causes the spinner blade to rotate when the lure is pulled through water.

16. The fishing lure of claim 14, wherein the spinner blade connector is a clevis-type device with openings at said each end for the lure spindle to pass through.

17. The fishing lure of claim 14, wherein the lure body is a plastic or glass bead that reflects or refracts light to attract fish.

18. The fishing lure of claim 14, wherein a speed of rotation of the spinner blade and lure body is based on a diameter of the lure body.

19. The fishing lure of claim 14, wherein the fishing hook is a treble hook.

* * * * *